Nov. 22, 1932.  G. E. HAZARD  1,888,948
VALVE
Filed Feb. 1, 1928
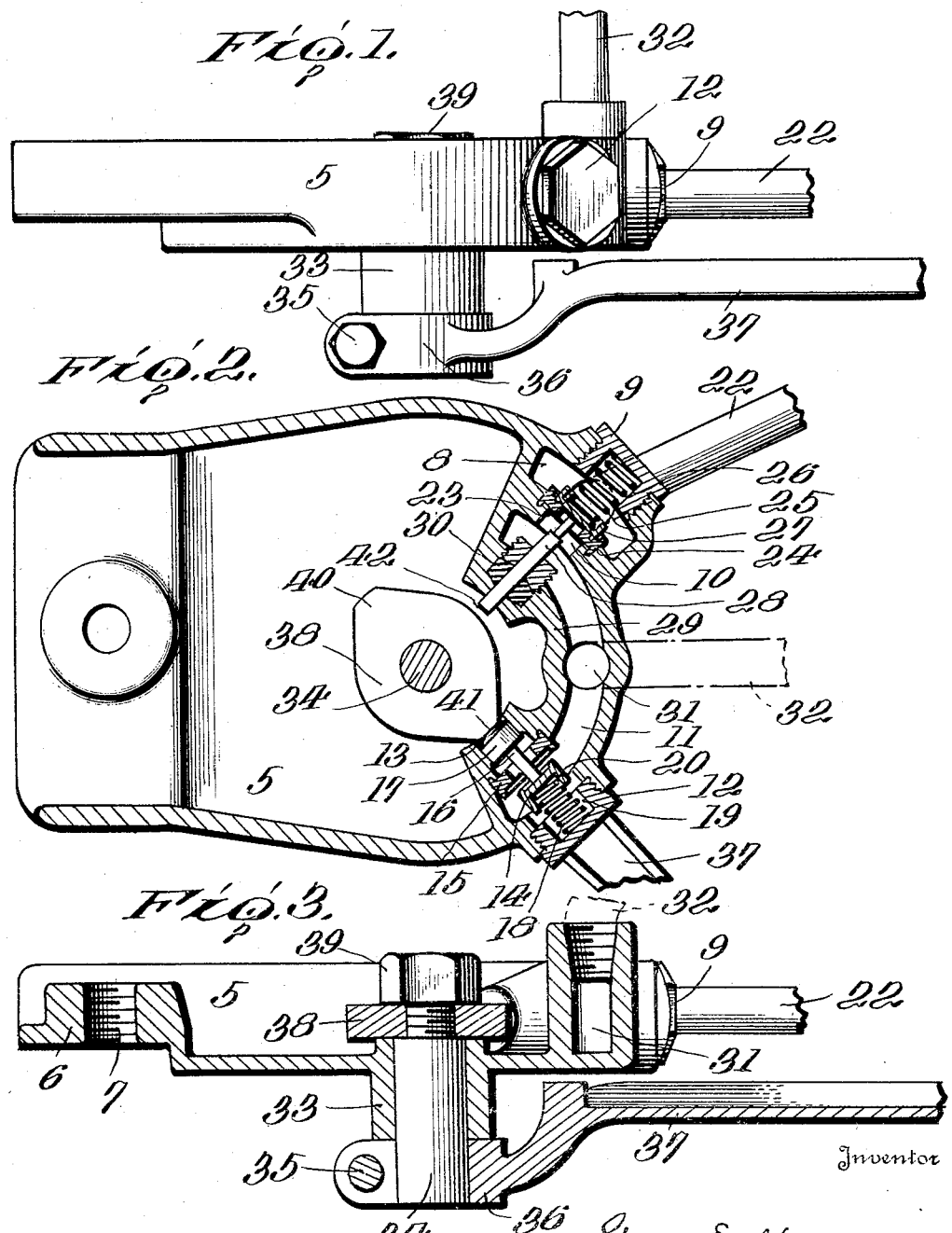
Inventor
George E. Hazard,
By A. S. Pattison & Son
Attorneys.

Patented Nov. 22, 1932

1,888,948

UNITED STATES PATENT OFFICE

GEORGE EDGAR HAZARD, OF ROCHESTER, NEW YORK, ASSIGNOR TO KELLOGG MANUFACTURING COMPANY, OF ROCHESTER, NEW YORK

VALVE

Application filed February 1, 1928. Serial No. 251,183.

This invention relates to improvements in valves being more particularly and specifically directed to a valve for controlling and directing air or liquid pressure to a cylinder having therein a reciprocating piston.

A valve constructed as shown in the drawing and as hereinafter described, can be used in connection with machines or apparatus of many different characters or types, but the present invention is particularly made for use in connection with my tire inspection machine, an application for which is pending under Serial No. 245,382, in which machine there is a reciprocating piston which is one of the moving elements. This reciprocating piston is driven by either air or liquid pressure which pressure is alternately manually directed by a valve to enter the cylinder above the piston and to be cut off entirely from admission to the cylinder.

Although the present improved valve construction is particularly adapted for use with the machine just described above, it will be readily understood that it can be easily and quickly adapted to other machines or apparatus without departing from the spirit of the invention.

The primary object of the invention is the provision of a valve of novel and improved construction which can be operated easily by the mere touch of the finger of the operator and is very rapid in its operation.

A further object of the invention is the provision of a valve of the character described which is cheap and simple of manufacture and highly efficient in operation.

Other objects, novel features of construction and improved results of the valve will appear from the accompanying drawing and the following description.

In the drawing:

Figure 1 is a view in side elevation of the improved valve.

Figure 2 is a horizontal sectional view through the valve.

Figure 3 is a vertical central sectional view of the valve.

Reference being had to the drawing in which a preferred embodiment of the invention is illustrated and in which like parts are described by similar reference numerals throughout the description, it will be seen that there is provided a housing 5 which is cast in one piece and provided at one end with a boss 6 having an internally threaded opening 7 which provides an easy and ready means of supporting the housing through the medium of a bolt to a machine or other device.

Cast integral as a part of the housing and within the same at the end opposite to the boss there is provided a valve chamber 8 closed against communication with the atmosphere by a screw plug 9 and having communication through a port 10 with an elongated arcuate shaped air chamber 11 at one end thereof, which chamber is also cast integrally with the housing.

The opposite end of the air chamber 11 has two openings to atmosphere, one of which is closed by a screw plug 12 while the opposite outlet is designated at 13 and is normally closed against communication with the atmosphere by a valve 14 which cooperates with a valve seat 15 above the inner end of the outlet opening 13. The valve 14 is provided with a stem 16 terminating in a plunger 17 which reciprocates in the opening 13 and acts as a guide. Mounted above the valve 14 is a coil spring 18, one end of which is seated within a cup-shaped recess 19 which forms the inner face of the screw plug 12, while the opposite end of the coil spring rests upon the valve 14 and is held in place thereon by a peripheral flange 20. The coil spring 18 will of course normally tend to hold the valve 14 in a closed position against its seat.

The air or liquid pressure from a compressor (not shown) or other source of supply, is supplied to the valve chamber 8 by a pipe or conduit 22.

The valve chamber 8 is normally closed against communication with the air chamber 11 by a valve 23 which is normally held against its seat 24 by a coil spring 25, one end of which is positioned with a cup-shaped depression 26 which forms the inner side of the screw plug 9 while its opposite end bears against the top of the valve and is held in place thereon by a peripheral flange 27 which is formed as a part of the valve proper.

The valve 23 is provided with an elongated stem 28 which extends downward through the port 10 and the air chamber 11 and passes through the bottom or wall 29 of the air chamber. The opening in the air chamber wall through which the valve stem passes is enlarged and provided with a packing 30 to prevent the escape of air from the air chamber.

Positioned preferably intermediate the two valves in the air chamber 11 is an opening 31 having communication with a pipe or conduit 32 which is intended to be connected to the cylinder of a machine for the purpose of delivering air to the cylinder for reciprocating the piston therein.

By reference to Figures 1 and 2 it will be seen that the valve housing 5 is provided with a flange or collar 33 in which is rotatably mounted a stub shaft 34 one end of which is clamped, as at 35, to the collar 36 of the operating handle 37. The opposite end of the stub shaft 34 is prevented from pulling through the housing collar 33 by reason of a cam 38 and a nut 39.

The nut and cam are within the valve housing 5 and the cam is provided with two high spots 40 and 41 which high spots are adapted to engage the extending ends 42 of the valve stem 28 and the plunger guide 17 of the valve rod 16. The high spots 40 and 41 of the cam are positioned at opposite sides of the cam and consequently by rocking or oscillating the valve handle 37, these high spots can be caused to engage the ends of the valve rod and the valve plunger guide.

*Operation*

Referring to Figure 2 of the drawing, the valves are positioned for permitting the exhaust of the high pressure from the cylinder to which it has been delivered.

The air chamber 11 is constantly in communication with the cylinder through the conduit 32 and as the high spot 41 of the cam has been positioned to engage the plunger guide 17 and lift the valve 14, the pressure in the cylinder and the air chamber can escape through the opening 13 to atmosphere.

By oscillating the handle 37 to its opposite position, the high spot 41 will pass out of engagement with the plunger guide and permit the coil spring 18 to close the valve 14.

Simultaneously with the movement of the operating or control handle the high spot 40 of the cam will engage the end 42 of the valve rod 28 and lift the valve 23 against the tension of its coil spring and permit the delivery of air from the delivery pipe 22 and the valve chamber 8 into the air chamber 11 and through the conduit 32 to the cylinder to operate the piston.

From the description given it will be readily understood that by moving the operating handle from left to right or right to left, the air is automatically delivered to the cylinder and the cylinder is permitted to purge itself of air through the outlet opening 13 in accordance with the direction of movement of the operating handle.

With the valve construction described, a perfect control of pressure to the cylinder is obtained as is also a rapid operation. The valve has been found to be very tight and not prone to leakage.

Attention is also directed to the fact that the construction is such that the valve can be easily and quickly serviced in case of any trouble in its operation or performance.

Having thus described my invention, what I desire to claim and secure by Letters Patent is:

1. A valve comprising a housing having in one end thereof a valve chamber and an air chamber having communication with one another, a valve in the valve chamber provided with a coil spring normally holding the valve upon its seat to close communication between the chambers, a screw plug in the valve chamber above said valve provided with a cup-shaped depression adapted to receive one end of said valve spring, said valve provided with a peripheral flange adapted to engage the opposite end of said valve spring and hold it in position upon said valves, an elongated stem for said valve extending across the air chamber and beyond the inner wall of said chamber, an escape opening in the inner wall of said air chamber and a valve of similar construction to said first mentioned valve normally closing said outlet opening, the elongated end of said valve provided with a guide plunger adapted to reciprocate in said outlet opening and protrude inwardly beyond the same, an outlet delivery pipe constantly in communication with said air chamber, a cam having two oppositely disposed high spots positioned within said housing and adapted to engage the protruding ends of said valve stem and said guide plunger, and means to oscillate said cam for the purpose described.

2. A valve comprising an elongated housing of approximately a horseshoe shape having formed integrally in its rounded end an elongated arcuate shaped air chamber and a valve chamber in communication therewith, a valve in the valve chamber normally closing communication between the chambers, an escape opening in the inner wall of the air chamber and a valve in said chamber normally closing said opening, an outlet delivery pipe constantly in communication with said air chamber, said valves having elongated stems protruding through and beyond the inner wall of the said air chamber and into said housing, a shaft in said housing carrying at one end a cam, said shaft and cam positioned beyond the extending valve ends and the cam provided with two oppositely disposed high spots adapted to engage the protruding ends of said valve stems, and said cam shaft externally of said housing carrying an operating handle, the outer end of which extends under and beyond the rounded housing end carrying the air chamber, and said cam oscillated by said operating handle for operating the valve as desired.

3. A valve comprising an elongated flat housing of approximately a horseshoe shape having formed integrally in its rounded end an elongated arcuate shaped air chamber and a shorter arcuate shaped valve chamber adjacent one end of the elongated chamber and in communication therewith, said housing at its open end provided with means for attaching the housing to a support, an air supply conduit constantly in communication with the short valve chamber, a valve in the valve chamber normally closing communication between the valve chamber and the elongated air chamber, said valve provided with a stem extending through the main elongated air chamber and terminating in the horseshoe shaped housing, an escape opening in the inner wall of the main elongated air chamber and a valve in said chamber normally closing said opening, said valve having an elongated stem extending into said horseshoe shaped housing, an outlet delivery pipe constantly in communication with the said elongated air chamber, said housing provided with an opening surrounded by an extending flange forming a bearing, a shaft rotatably mounted in said bearing, the end of the shaft in said housing carrying a cam and the end of the shaft external of the housing carrying an operating handle, said cam being positioned beyond the extending ends of the valve stems and provided with two high spots adapted to engage and operate said valve stems upon the movement of the cam by said operating handle.

In testimony whereof I hereunto affix my signature.

GEORGE EDGAR HAZARD.